US007342585B2

(12) United States Patent
Matskewich et al.

(10) Patent No.: US 7,342,585 B2
(45) Date of Patent: Mar. 11, 2008

(54) USE OF AN INPUT OVERSCALED BITMAP TO GENERATE EMBOLDENED OVERSCALED BITMAP

(75) Inventors: Tanya Matskewich, Kirkland, WA (US); David L. Kilgrow, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 107 days.

(21) Appl. No.: 11/158,502

(22) Filed: Jun. 22, 2005

(65) Prior Publication Data

US 2006/0146054 A1 Jul. 6, 2006

Related U.S. Application Data

(60) Provisional application No. 60/640,868, filed on Dec. 30, 2004.

(51) Int. Cl.
*G06T 11/00* (2006.01)

(52) U.S. Cl. ....................... 345/472; 345/613; 345/467

(58) Field of Classification Search ..................... None
See application file for complete search history.

(56) References Cited

U.S. PATENT DOCUMENTS

| | | | | |
|---|---|---|---|---|
| 6,542,161 | B1 * | 4/2003 | Koyama et al. | 345/589 |
| 6,782,142 | B2 | 8/2004 | Loce et al. | 382/296 |
| 2004/0076343 | A1 * | 4/2004 | Zhang et al. | 382/300 |

* cited by examiner

*Primary Examiner*—Mark Zimmerman
*Assistant Examiner*—Kevin Xu
(74) *Attorney, Agent, or Firm*—Workman Nydegger

(57) ABSTRACT

A computer-implemented simulated emboldening mechanism for emboldening an input overscaled bitmap to generate an emboldened overscaled bitmap. The simulated emboldening adjusts the number of subpixels to turn on in the direction of emboldening taking into account contextual information regarding surrounding subpixels. Since the emboldening works directly from an overscaled bitmap, and takes such contextual information into account, legibility and readability of the resulting emboldened character is enhanced.

20 Claims, 20 Drawing Sheets
(14 of 20 Drawing Sheet(s) Filed in Color)

USE OF AN INPUT OVERSCALED BITMAP TO GENERATE EMBOLDENED OVERSCALED BITMAP

CROSS-REFERENCE TO RELATED APPLICATIONS

The present application claims the benefit of U.S. provisional patent application Ser. No. 60/640,868 entitled "Enhanced Simulated Emboldening" filed Dec. 30, 2004, which provisional patent application is incorporated herein by reference in its entirety.

BACKGROUND OF THE INVENTION

1. The Field of the Invention

The present invention relates to font rendering technology; and more specifically, to mechanisms for performing algorithmic simulated emboldening of font characters.

2. Background and Related Art

Computing technology enables a wide-variety of applications. Some of these applications interface with human beings by receiving input from a human user via, for example, a mouse, keyboard, microphone, camera, or the like, or by providing output to a human user via, for example, a speaker, display or printer. In particular, since sight is such a dominant human sensory capability, human users typically rely on some sort of printer or display in order to interpret computational results and/or to interface with an application.

One type of displayed material is characters. Sets of characters (whether it be text or otherwise) may often be logically grouped together. A font represents an example of a logical grouping of characters. In particular, a font is a set of printable or displayable characters in a specific style and size. The characters of the font are often termed "glyphs".

Characters (glyphs) of a font can be described by outlines or by embedded bitmaps. An outline describes the character by describing the contours of the character shape. Such outlines are more easily scalable. During the rasterization process, software may convert the outline into a bitmap that is suitable for display given the desired point size or Pixels Per EM (ppem).

Embedded bitmaps are usually manually pre-designed bitmap images that correspond to specific ppems. Embedded bitmaps usually are present only for low and middle ppems and for those ppems that usually require higher image quality than those that result from rasterization of unhinted outlines. Hinting is a conditional modification of the outlines which presents another way (compared to embedding bitmaps) of improving quality of the rendered results for low ppems.

Traditionally, characters in fonts with relatively small numbers of characters and relatively simple character shapes (such as Latin) are described by hinted outlines. On the other hand, characters in fonts with a large number of characters and relatively complex character shapes (such as East Asian fonts, hereinafter also referred to as EA) are described by unhinted outlines and usually by a series of embedded Black and White bitmaps (hereinafter also referred to as BW). Those more complex fonts usually have embedded bitmaps for some, but not necessarily all, low and middle ppems. Furthermore, the embedded bitmaps do not necessarily cover the full repertoire of the characters in the font. Very rarely, fonts contain Anti-Aliasing (AA) embedded bitmaps. Very few, if any, fonts contain embedded bitmaps in CLEARTYPE ® (hereinafter referred to as CT) format.

In some circumstances, it is desirable to "bold" characters. Bolded characters tend to have a heavier visual and typographic weight. Bolded characters are often provided in place of their counterpart regular weight characters. There are a number of instances in which it may be desirable to bold characters. For example, characters are often bolded to emphasize the meaning conveyed by the characters.

A font has a true bold version if there are separate designs of the font characters representing heavier weight and those designs are stored in a way recognizable by the rendering software as being associated with the original font. True bold designs associated with characters of a font do not necessarily follow a uniform bolding transformation with respect to the characters of the original regular weight font. Different elements of the characters are emboldened in the different ways, as appropriate, given the unique form of the character. Often, a human being is involved with the custom design of bolded fonts so as to take into account a host of subjective aesthetic judgments that contribute to a more authentic high quality bolded look.

Traditionally, most commonly-used fonts with smaller numbers of characters and relatively simple character shapes (such as Latin fonts) have associated true bold versions. However, due to the time and cost associated with custom design of fonts, most of the bigger fonts with more complicated characters and larger numbers of characters do not have associated true bold versions. Furthermore, the design of such true bold fonts for these complex character sets can be prohibitively expensive. As a result, if a user chooses a bold option, a simulated emboldening is executed by a rendering engine.

Simulated emboldening is an automatic, algorithmic procedure performed by a rendering engine based on the data from the regular font. Currently applied simulated emboldening is performed by a uniform algorithm that is not always sensitive to the original design intent or to the numerous subjective judgments that improve the quality and appearance of the bolded font data.

Although currently applied simulated emboldening algorithms for simulated emboldening provide quite legible results for the fonts with simpler characters, such algorithms usually fail to provide legible results for the fonts with more complex and dense characters.

In a simplified view, the rendering process may be divided into three stages. In the first stage, information from the font file is accessed and, if needed, translated into a rasterizer-readable format. In the second stage, the rasterization process occurs in which the rasterizer-readable font format is converted into a two dimensional-array of values called a bitmap. The bitmap will have one value per pixel for a "simple bitmap", and more than one value per pixel for an "overscaled bitmap" as is the case for a CLEARTYPE ® bitmap. The value may be a simply binary value (e.g., a zero or a one) for a Black and White (BW) bitmap, or a range of values (e.g., from 0to 16) for an AA bitmap. In the third stage, the actual mapping of the bitmap values to the pixels (or pixel sub-components) of the display occurs resulting in the character being displayed.

Simulated emboldening happens at the second stage during the rasterization process. Although the third stage of mapping the bitmap values to the display may influence the choice of a particular emboldening algorithm and/or tuning the parameters once an algorithm is chosen, particular kinds of mappings can be omitted from the description for clarity in describing the basic principles and embodiments of the present invention. As simulated emboldening algorithms occur during the second stage of rasterization process, the second stage processing will be the primary stage that is discussed herein.

Currently, there are three primary rendering modes; namely, Black and White (BW), Anti-Aliasing (AA) and CLEARTYPE ® (CT). Conventionally, at the rasterization stage, the rendering mode defines the final format of the bitmaps and, in particular, the output format of the emboldened bitmaps if emboldening is applied.

There are a variety of factors that may influence a choice of the rendering mode. Such factors may include, for example, device properties and settings, requested ppem, font data (for example, presence of the embedded bitmaps, presence and content of the "gasp" table (as in an OPENTYPE ® /TrueType font file)), presence and kind of any geometrical transformation requested. Other factors can influence the choice of the rendering mode. For example, the "complexity" of the font may be considered in choosing the rendering mode. For example, it may be decided to apply BW rendering mode and make use of embedded BW bitmaps for relatively complex fonts and apply CT rendering mode and completely ignore embedded BW bitmaps for relatively less complex fonts.

The choice of rendering mode does not necessary fully realize all the possibilities of the display device. In many situations, the choice is made by software and is based on the general experience of the different rendering modes being more or less legible for the human eyes under different conditions. For example, at low ppem, the AA rendering mode usually provides lower quality rendering results than the BW mode, especially if a font contains BW embedded bitmaps. Therefore, a flag in the "gasp" table can force the BW rendering mode to be applied when rendering low ppem characters, even though the great majority of the display devices can display shades of gray. The same is true regarding CLEARTYPE ®. For example, it might be decided to apply BW rendering mode for relatively complex fonts at lower ppems where the embedded BW bitmaps are present in the font, even though the display device has the capability to render in CT mode. The selected rendering mode should provide the best user experience, and can be changed if another rendering mode appears to provide better rendering results.

Currently, regular weight and bold weight characters are commonly rendered in the same rendering mode assuming that all other conditions are the same. However, this decision does not reflect any internal requirements and can be overwritten if another approach will be shown to produce better rendering results.

Current algorithms for bitmap emboldening commonly use the same types of bitmaps for input and output, which means that for an emboldening algorithm, the rendering mode currently implicitly establishes both input and output types. However this dependency is not generically necessary.

The rasterization process goes through the same major steps for the regular and the simulated bold weights. One difference is that if a form of simulated emboldening is applied, an additional emboldening step is used in the rasterization process. This emboldening step intercepts the flow of rasterization as it would be performed for a regular weight, performs necessary emboldening operations, and then lets the flow of the rasterization continue exactly as in the case of a regular weight. Therefore, there will now be some general background description of rasterization for the regular weight so that the emboldening step may be understood in its proper rasterization context.

A rasterizer might accept a lot of different parameters related to specific characteristics of a font or to different rendering conditions being requested. For the purpose of describing the conventional model of simulated emboldening, we will concentrate on the following input information given to a rasterizer:

Information regarding identification of a character being requested (for example a Unicode character code).

Information regarding rendering conditions such as size (ppem), presence of a non-identical geometrical transformation, request for simulated emboldening. If a simulated emboldening is requested, some additional parameters identifying "heaviness" (amount of emboldening) and direction of the emboldening will be passed to the rasterizer (described below in more detail).

Information coming from the font file: such as whether an embedded bitmap is present for a particular character or sum of the characters for the same conditions, access to the description of the embedded bitmap or/and the outline data for a specific character, information specified by designers such as a preferred rendering mode for particular ppems.

Information regarding the rendering mode (which defines the format of the resulting bitmap): specification of the rendering mode BW, AA or CT and any additional required information (for example, in the case of AA emboldening—requested number of gray levels).

The rasterizer will perform appropriate rasterization based on the input information, and will provide a resulting bitmap in the format corresponding to the requested rendering mode, along with metric information related to the size and positioning of the resulting bitmap.

Since the new algorithms for the emboldening simulation described in the detailed description of the preferred embodiments section below are not intended to necessarily modify the metric information, the bitmap output of the conventional rasterization processes will now be described.

In CT rendering mode, fonts do not conventionally contain embedded bitmaps in the CT format. Therefore, rasterization in CT mode always starts from the outline data. There are two major stages of the CT rasterization process as illustrated in FIGS. 1A and 1B: "(CT: Outline to Overscaled Bitmap)" (see FIG. 1A. with the first image (from left to right) comprising the Outline and the second image comprising the Overscaled Bitmap) and "(CT: Overscaled to Simple Bitmap)" (see FIG. 1B, with the images (from left to right) comprising an overscaled bitmap, a simple bitmap output, a simple bitmap with values reflecting filtering, and an image of possible mapping of cleartype values). The algorithm for computation of the overscaled bitmap based on the outline data used during stage (CT: Outline to Overscaled Bitmap) and the algorithm for computation of the final values of the simple CT bitmap during stage (CT: Overscaled to Simple Bitmap) do not depend one each other, and can be modified independently as long as they work with the required input and output formats.

Whichever approach is being used, the final output has the same format: simple CT bitmap. An important characteristic of this rasterization process is that it uses overscaled bitmap as an intermediate result of computation of the final output bitmap.

Now that the rasterization process has been described generally for the CT rendering mode, the description proceeds to conventional CT emboldening algorithms. Depending on the type of input, algorithms for the emboldening simulation are subdivided into two large groups: "bitmap emboldening" and "outline emboldening". In addition to the various emboldening parameters, a bitmap. emboldening algorithm accepts a bitmap as its input, while an outline emboldening algorithm accepts an outline as its input. Bitmap emboldening returns a bitmap as its output, while outline emboldening returns a modified outline, which later will be scan-converted in order to produce a bitmap.

Bitmap and outline emboldening algorithms are applied at different stages of the rasterization process. Outline emboldening will be always applied before the first step of the rasterization process as it would be performed for a regular weight. After an outline emboldening is performed, the rasterization will continue exactly as it would in the case of a regular weight.

Currently, outline emboldening is almost never applied. Bitmap emboldening is performed by most of the applications in most situations, except in the rare cases when a non-trivial geometrical transformation is applied to a text. The capability of applying bitmap emboldening does not depend on the character having an embedded bitmap. Bitmap emboldening can thus be applied to characters that either have, or do not have, an embedded bitmap. If the character does not have an embedded bitmap for the requested condition, the result of scan-conversion based on the outline information will serve as an input for a bitmap emboldening algorithm. The principles of the present invention apply more to bitmap emboldening and thus several conventional bitmap emboldening algorithms will now be described.

By definition, bitmap emboldening algorithms accept bitmaps as their input and return bitmaps as their output. In addition to the bitmap itself, a bitmap emboldening algorithm usually accepts information regarding heaviness and direction of emboldening. This information can be expressed by a pair of "emboldening shifts" in the horizontal and vertical directions respectively. An emboldening shift identifies by which amount (expressed in pixels) an emboldened bitmap should be visually heavier than the original one and a sign of a shift shows the direction (to the right/to the left and to the top/to the bottom) of the emboldening. Most of the current applications work with emboldening shifts corresponding to whole numbers of pixels only. In addition, at low/middle and even at the lower range of high ppems (e.g., up to about 50 ppem), simulated emboldening by 1 pixel to the right (and 0 pixels in the vertical direction) is usually applied.

The input bitmap can originate from different data (such as embedded bitmap or a glyph's outline) and can be computed in different ways. The particular way the input bitmap is computed is irrelevant for the emboldening algorithm that is applied to the bitmap. What matters is which format of an input bitmap is expected by an emboldening algorithm and which format of an output bitmap the algorithm will generate. The various emboldening algorithms will thus be distinguished based on the format of the input and output bitmaps.

Different kinds of bitmap emboldening algorithms can be applied at different steps of the rasterization process since different steps of the rasterization process work with bitmaps in different formats. However currently applied bitmap emboldening algorithms often start with simple bitmaps (in BW, AA or CT format) and generate simple bitmaps in the same format as their input.

Most of the currently applied bitmap emboldening algorithms work with simple bitmaps both as input and output, even during a rasterization process that involves computation of overscaled bitmaps. If overscaled bitmaps are computed, emboldening is applied after the overscaled bitmap is converted into a simple bitmap.

In addition, most of the currently applied bitmap emboldening algorithms have exactly the same output bitmap format as the input bitmap format.

Furthermore, the algorithms often turn on or make darker some of the pixels that were off or had lighter colors in the input bitmap, and often do not turn off pixels or make them lighter.

Also, conventional algorithms typically decide whether to modify a value of a specific pixel based on the local characteristics of the input bitmap, such as one (for low/middle ppems) or several neighboring pixels in the direction of the emboldening. Currently used algorithms do not use information of the neighboring pixels in the direction perpendicular to the emboldening.

Moreover, conventional algorithms work row-by-row (for horizontal emboldening) and column-by-column (for vertical emboldening) and, therefore, the algorithms analyze only one direction (either horizontal or vertical) at a time. In other words, the resulting value of a pixel depends on neighbors of a pixel either in the row only or in the column only and does not take into account a two-dimensional neighborhood.

Currently applied bitmap emboldening algorithms can be applied in the horizontal or vertical direction. Algorithms for horizontal and vertical directions are essentially symmetric, with change of the directionality only. Generally, the algorithms for horizontal and vertical emboldening do not intermix. In other words, if the emboldening should be applied in both directions, it will first be applied in one direction and then applied in another direction to the result of the emboldening in the first direction.

Furthermore, besides the rectangular pixel area containing the input bitmap, the algorithms usually affect one or several rows and/or one or several columns adjacent to the rectangular area, depending on the values of the emboldening shifts accepted as the parameters.

For low/middle ppems (i.e., up to about 50 ppem), the algorithms usually apply emboldening by 1 pixel in the horizontal direction to the right. Note, that the low/middle ppems are exactly the area where the quality of the rendered images is especially challenging and where an improvement of the existing algorithms is especially required.

FIG. 2A illustrates the context of the conventional CT emboldening algorithm The conventional CT bitmap emboldening algorithm operates on a simple bitmap. The CT emboldening algorithm (referred to as "[Step 1A: Simple Subpixel Bitmap Regular to Simple Subpixel Bitmap Bold]" in FIGS. 2A and 2B) is applied as soon in the rasterization process as a simple bitmap becomes available. In other words, the CT emboldening algorithm is applied at the second stage (CT: Overscaled To Simple Bitmap) of the rasterization, between the first step [Step 1: Overscaled to Simple Subpixel Bitmap] and the second step [Step 2: Filtering] (see FIG. 1B).

Both the input and the output of the conventional CT emboldening algorithm are simple bitmaps in "subpixel" format, in which every value represents the cumulative numbers of subpixels of the different colors such as (Red, Green, Blue). The CT emboldening algorithm works according to an "additive" principle. The algorithm does not operate on exact positions of subpixels inside a pixel, but rather on the cumulative information regarding numbers of turned on subpixels.

Although the algorithm works with the cumulative values only, the results are quite similar to the simplest algorithm that would work directly on the overscaled bitmap, which provides a reasonable justification for the current algorithm. The problem is that the current algorithm often fails to produce legible results for more complex characters.

For emboldening by 1 pixel to the right, a conventional algorithm called hereinafter "<CT: Alg Standard>" works as follows:

For every row in the original bitmap, proceed from right to the left.

For every pixel:

```
If left neighbor of the pixel has a non-zero value V_left (i.e. has at least one
    turned on subpixel in the overscaled bitmap)
{
  If the pixel itself has a non-zero value (i.e. has at least one turned on
      subpixel in the overscaled bitmap)
  {
    Assign maximal value (corresponding to all subpixels turned on)
    to the pixel
  }
  Else
  {
    Assign value V_left to the pixel
  }
}
```

An example of application of the algorithm is shown in FIGS. 2B and 2C. This example continues from the description for the character "A" in the description of the CT rasterization process for a regular weight (compare to FIGS. 1A and 1B).

Accordingly, what would be advantageous are overscaled (e.g., CT) simulated emboldening mechanisms in which the emboldened character is more legible and readable, even for complex characters.

BRIEF SUMMARY OF THE INVENTION

The principles of the present invention relate to mechanisms and methods for emboldening an input overscaled bitmap (such as a CLEARTYPE ® overscaled input bitmap). After accessing the input overscaled bitmap, a simulated emboldening uses the input overscaled bitmap to generate an emboldened overscaled bitmap, thereby improving the appearance and readability of the emboldened character as compared to conventional simulated emboldening techniques.

Additional embodiments of the invention will be set forth in the description that follows, and in part will be obvious from the description, or may be learned by the practice of the invention. The embodiments of the invention may be realized and obtained by means of the instruments and combinations particularly pointed out in the appended claims. These and other embodiments of the present invention will become more fully apparent from the following description and appended claims, or may be learned by the practice of the invention as set forth hereinafter.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

DETAILED DESCRIPTION OF THE PREFERRED EMBODIMENTS

Figure 1A:
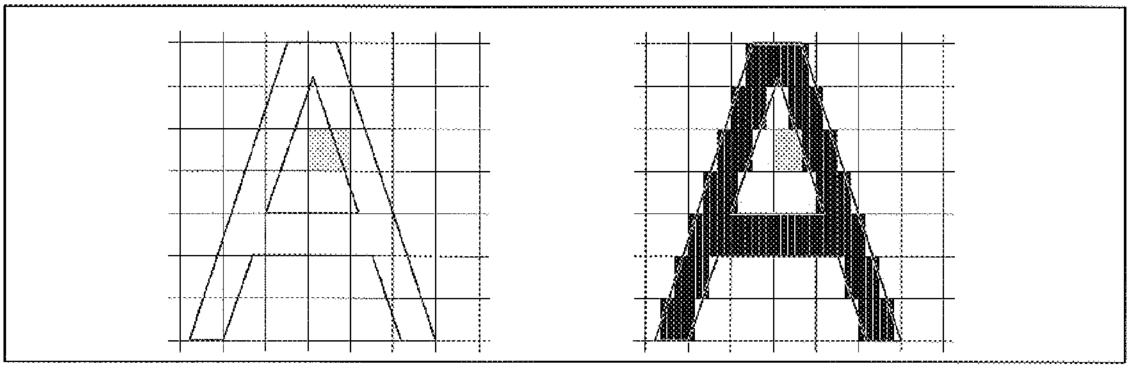
FIG. 1A illustrates a conventional conversion of a font outline to an overscaled bitmap in which there is oversampling by 6 in the horizontal direction, and no oversampling in the vertical direction.
Figure 1B:
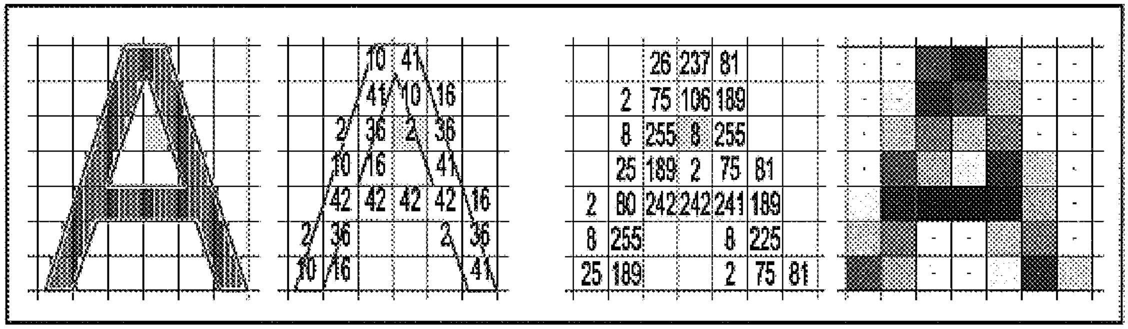
FIG. 1B illustrates a conventional conversion of an oversampled bitmap to a simple bitmap.
Figure 2A:
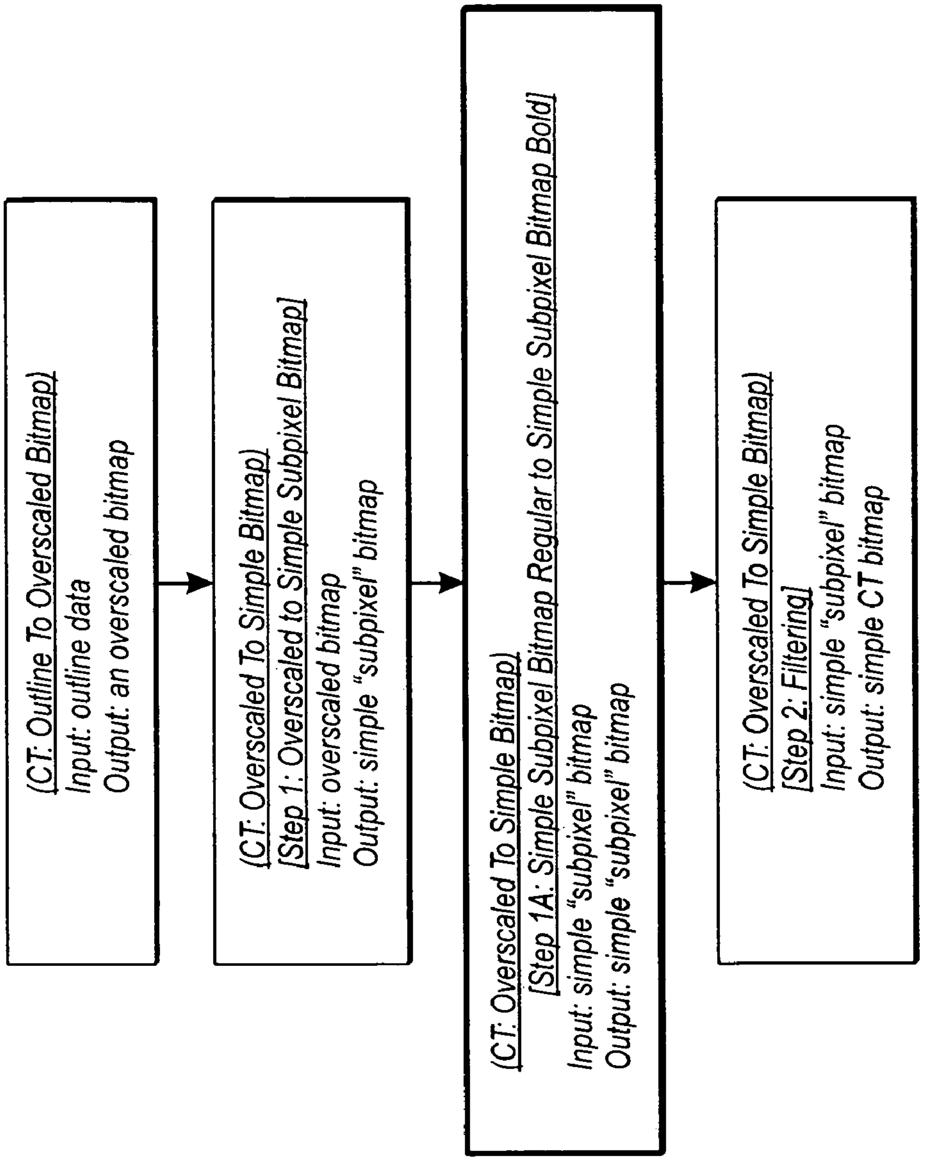
FIG. 2A illustrates a flowchart of a conventional rasterization process for overscaled bitmap rendering.
Figures 1, 2B:
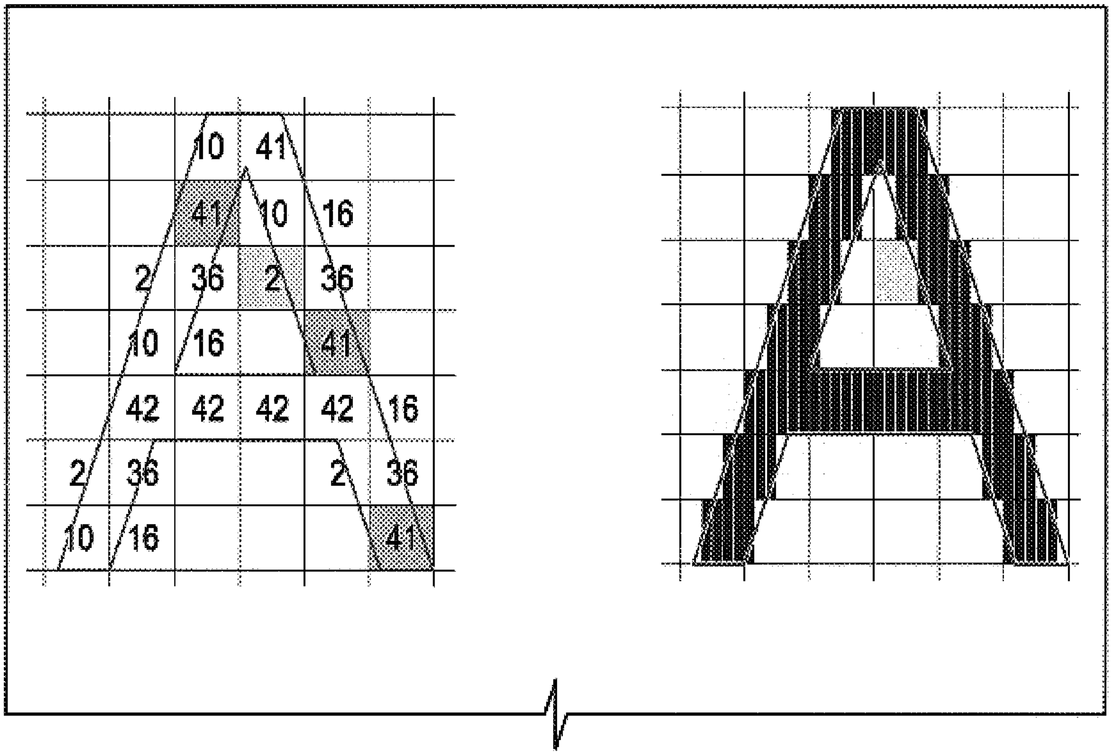
FIG. 2B illustrates a conventional conversion of an oversealed bitmap to a simple bitmap, with FIGS. 2B-1 and 2B-1 showing oversealed bitmaps and a corresponding simple bitmaps.
Figures 2, 2B:
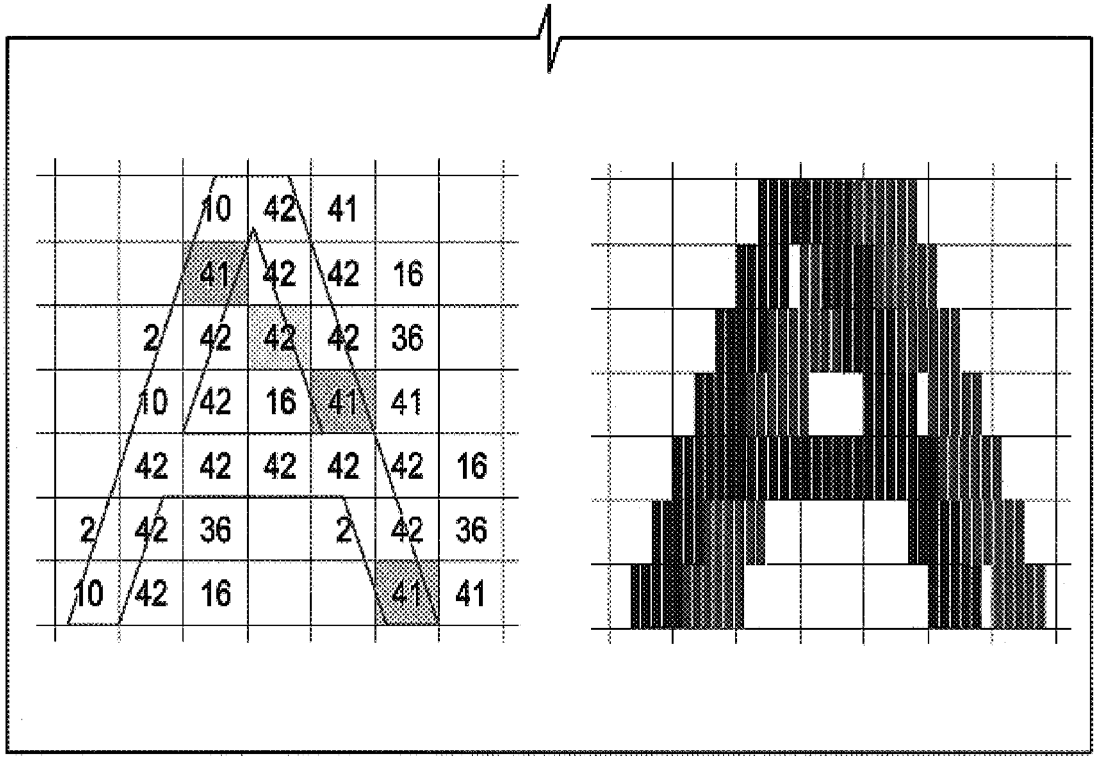
Figure 2C:
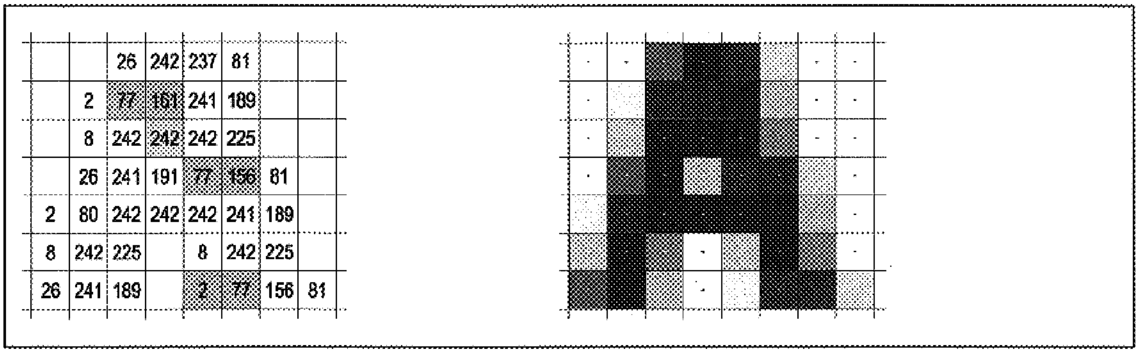
FIG. 2C illustrates a filtering step of the conventional conversion of an overscaled bitmap to a simple bitmap and reflects an overscaled bitmap and an image of a corresponding possible color mapping of the overscaled bitmap.

The principles of the present invention relate to improved simulated emboldening mechanisms that substantially improve legibility and readability for emboldened characters, even for intricate and complex characters and/or characters displayed at small point sizes. Two groups of emboldening mechanisms will be described. The simulated emboldening methods start from an overscaled bitmap and result in an emboldened overscaled bitmap.

Prior to describing the details of the present invention, a suitable computing architecture that may be used to implement the principles of the present invention will first be described with respect to FIG. 3. In the description that follows, embodiments of the invention are described with reference to acts and symbolic representations of operations that are performed by one or more computers, unless indicated otherwise. As such, it will be. understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the principles of the invention are being described in the foregoing context, it is not meant to be limiting as those of skill in the art will appreciate that several of the acts and operations described hereinafter may also be implemented in hardware.

Turning to the drawings, wherein like reference numerals refer to like elements, the principles of the present invention are illustrated as being implemented in a suitable computing environment. The following description is based on illustrated embodiments of the invention and should not be taken as limiting the invention with regard to alternative embodiments that are not explicitly described herein.

Figure 3:
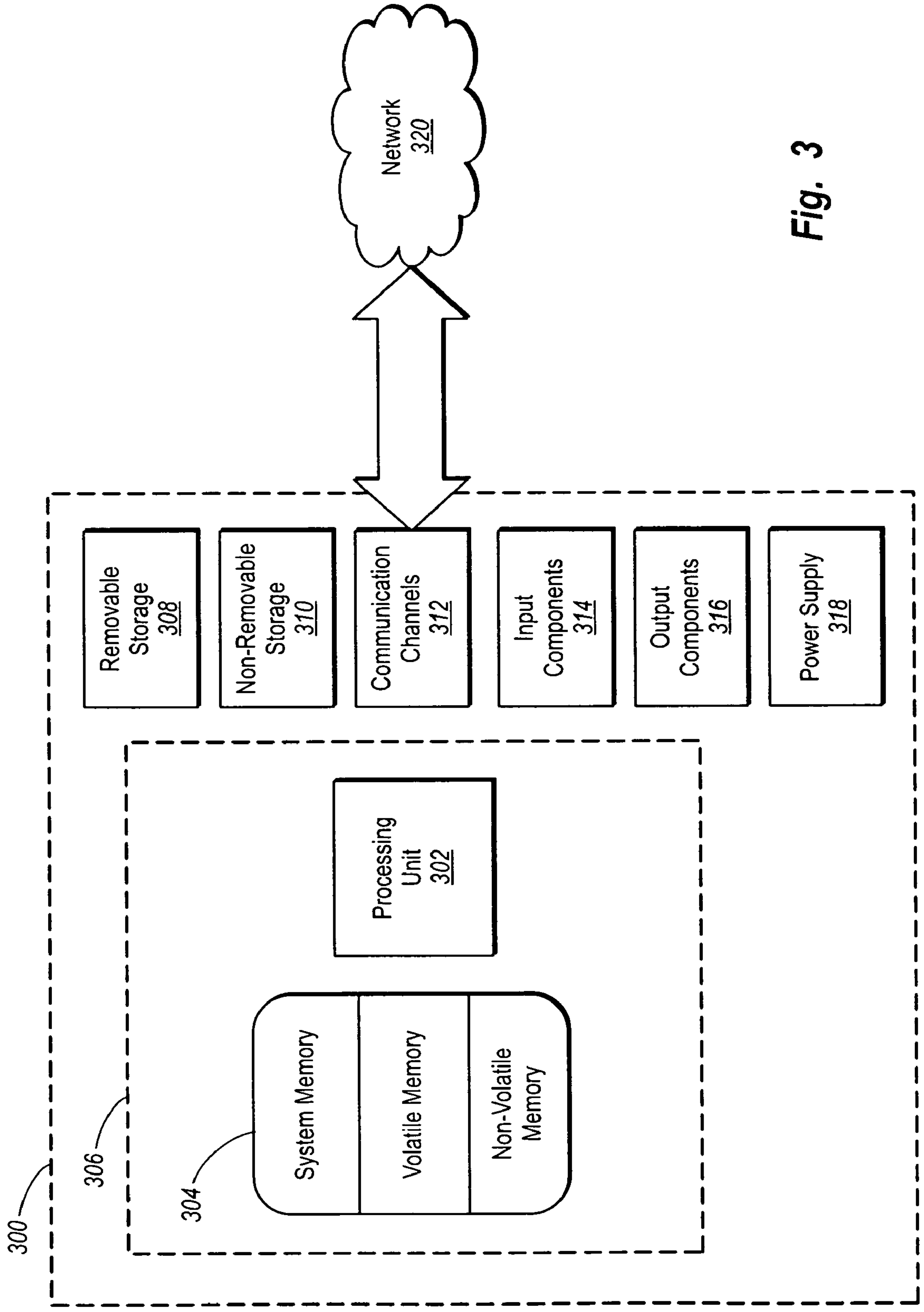
FIG. 3 illustrates an example computing environment in which the principles of the present invention may be practiced.

FIG. 3 shows a schematic diagram of an example computer architecture usable for these devices. For descriptive purposes, the architecture portrayed is only one example of a suitable environment and is not intended to suggest any limitation as to the scope of use or functionality of the invention. Neither should the computing systems be interpreted as having any dependency or requirement relating to any one or combination of components illustrated in FIG. 3.

The principles of the present invention are operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 300 typically includes at least one processing unit 302 and memory 304. The memory 304 may be volatile (such as RAM), non-volatile (such as ROM, flash memory, etc.), or some combination of the two. This most basic configuration is illustrated in FIG. 3 by the dashed line 306. In this description and in the claims, a "computing system" is defined as any hardware component or combination of hardware components capable of executing software, firmware or microcode to perform a function. The computing system may even be distributed to accomplish a distributed function.

The storage media devices may have additional features and functionality. For example, they may include additional storage (removable and non-removable) including, but not limited to, PCMCIA cards, magnetic and optical disks, and magnetic tape. Such additional storage is illustrated in FIG. 3 by removable storage 308 and non-removable storage 310. Computer-storage media include volatile and non-volatile, removable and non-removable media implemented in any method or technology for storage of information such as computer-readable instructions, data structures, program modules, or other data. Memory 304, removable storage 308, and non-removable storage 310 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system 300 may also contain communication channels 312 that allow the host to communicate with other systems and devices over, for example, network 320. Communication channels 312 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 300 may also have input components 314 such as a keyboard, mouse, pen, a voice-input component, a touch-input device, and so forth. Output components 316 include screen displays, speakers, printer, etc., and rendering modules (often called "adapters") for driving them. The computing system 300 may use the output components 316 and associated adapters for rendering the emboldened characters generated by any of the emboldening techniques described below. The computing system 300 has a power supply 318.

Having described a suitable computing environment in which the principles of the present invention may be employed, simulated emboldening methods in accordance with the principles of the present invention will now be described. These simulated emboldening methods apply to input overscaled bitmaps to generate output emboldened bitmaps that are also overscaled.

The simulated emboldening methods may operate under several general principles. According to a general principle (referred to herein as <Gen:0>), the emboldening simulation may be applied directly to the overscaled bitmap without any pre-processing and without first converting the overscaled bitmap into a simple bitmap as required by the convention <CT: Alg Standard> simulated emboldening method. Since an overscaled bitmap is rather clear, representing the design of a character expressed by an outline with a desired level of granularity more refined than at the pixel level, the application of an emboldening simulation to the overscaled bitmap rather than to a simple bitmap derived from the overscaled bitmap allows for improved emboldening of the represented character.

Another general principle (referred to herein as <Gen:1>) is that the simulated emboldening algorithms should not necessarily try to embolden the input overscaled bitmap by the number of subpixels that corresponds to the requested emboldening shift in pixels. For example, consider a CT rendering in which the overscaling factors are 6 in the horizontal direction and 0 in the vertical direction, and emboldening by one pixel to the right in the horizontal direction is requested. In this case, the principles of <Gen: 1> state that adding 6 subpixels to the right of every black subpixel of the input overscaled bitmap (i.e. emboldening by a whole pixel exactly as requested by the emboldening shift) does not necessarily provide the best results since this might lead to the original design of the character becoming unrecognizable in the emboldened overscaled bitmap. Adding a different number of subpixels may be more appropriate.

Figure 4A:
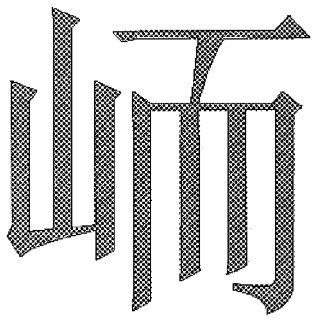
FIG. 4A illustrates an example character outline.
Figure 4B:
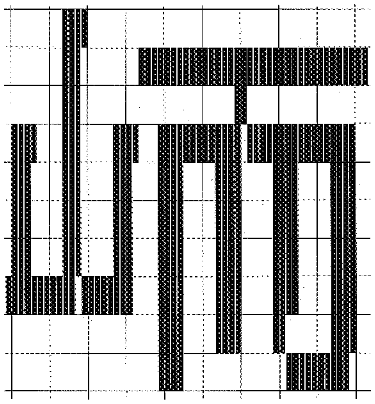
FIG. 4B illustrates an overscaled bitmap of the example character (of FIG.
Figure 4C:
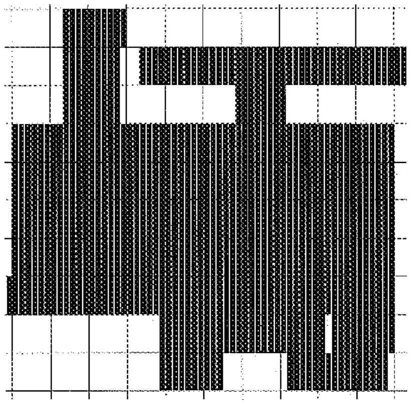
FIG. 4C illustrates an emboldened overscaled bitmap of the example character (of FIG. 4A) when subjected to conventional simulated emboldening.

In the example of FIGS. 4A through 4C, FIG. 4A shows an original design of a character to be emboldened. FIG. 4B shows an overscaled bitmap for a regular weight (of the character in FIG. 4A) and represents the input to an emboldening algorithm. FIG. 4C shows the result of the emboldening (of the input bitmap in FIG. 4B) by 6 subpixels (equivalent of 1 pixel) to the right. Most of the original design of the character (in FIG. 4A) is completely lost after emboldening. The result can be improved by application of a "fractional" emboldening in which perhaps less than 6 subpixels are added to the right.

Another general principle (referred to herein as <Gen:2>) is that an emboldening mechanism should avoid complete blocking of the white spaces between elements (herein after also referred to as "strokes") of the input bitmap so as to avoid the emboldening result becoming unrecognizable. Leaving some white subpixels between black subpixels of the input bitmap can alleviate this problem.

Figure 5A:
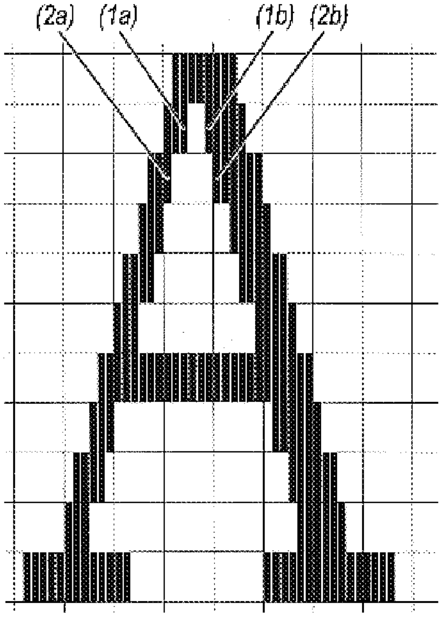
FIG. 5A illustrates an overscaled bitmap of an example character.
Figure 5B:
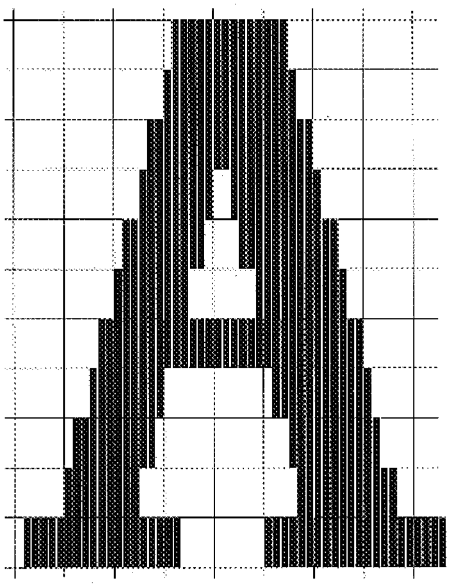
FIG. 5B illustrates an emboldened overscaled bitmap of the example character (of FIG. 5A) when subjected to conventional simulated emboldening.
Figure 6B:
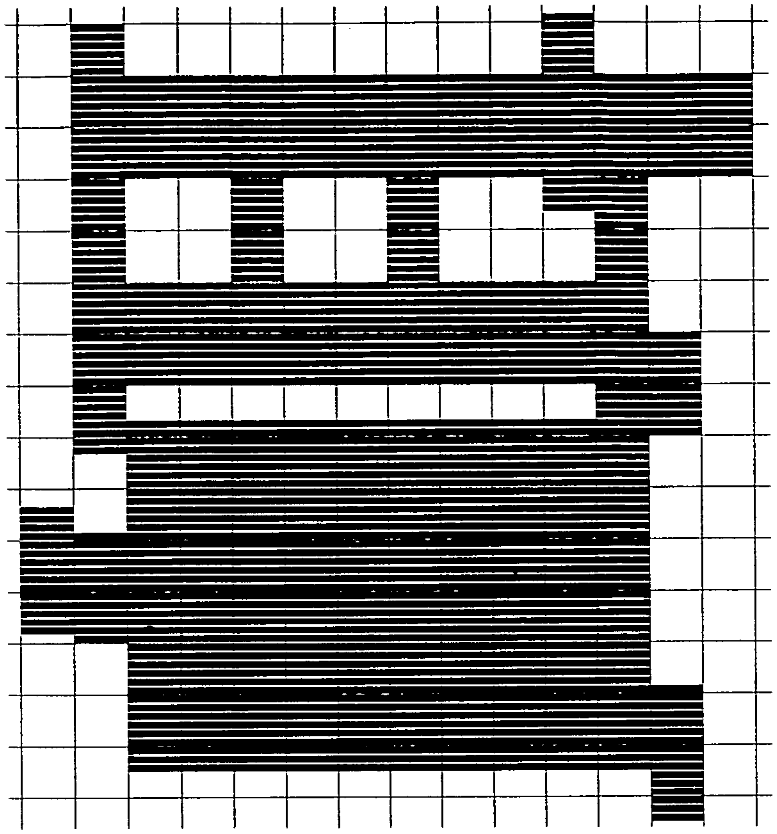
FIG. 6B illustrates an emboldened overscaled bitmap of the example character (of FIG. 6A) when subjected to conventional simulated emboldening in which visual separation of original design elements is not maintained.
Figure 6A:
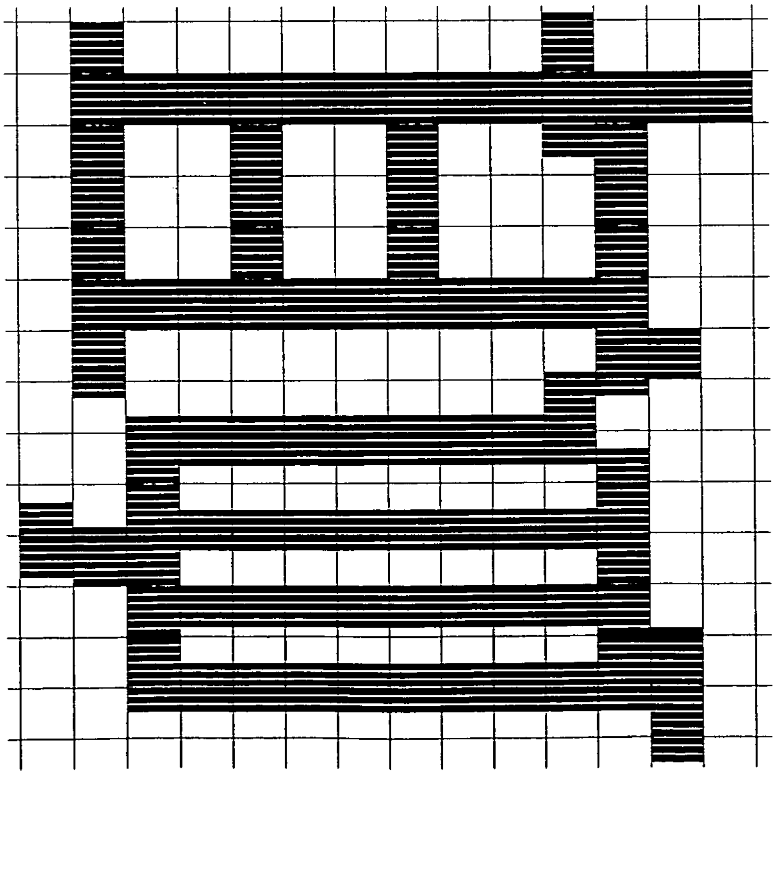
FIG. 6A illustrates an overscaled bitmap of an example character.

This does not mean that an emboldening method should necessarily leave white space between every pair of black subpixels from the input bitmap. For example, for the input subpixel configuration shown in FIG. 5A, adding a number of subpixels equivalent to a whole pixel (assume 6) to the right of every black subpixel of the original bitmap will work fine as shown in FIG. 5B, since the original design of the character is preserved even with some of the white space between subpixels (for example between (1*a*) and 1*b*), and between (2*a*) and (2*b*) disappearing. However the same emboldening approach will fail to preserve the design for a more complex and dense input bitmap shown in FIG. 6A, creating a partially unrecognizable resulting bitmap in FIG. 6B. In the case of FIGS. 6A and 6B, keeping distance by leaving some white space between vertical stroke elements of the input character is important.

The next example shows how even a relatively short simulated emboldening method that follows the principle <Gen:2> can help improve legibility of the rendering results. Assume that a pixel is subdivided into 6 subpixels, and that simulated emboldening is designated to occur towards the right by 1 pixel. Instead of simply adding 6 subpixels to the right of every black subpixel of the input overscaled bitmap, consider the method that will now be described.

Figure 7A:
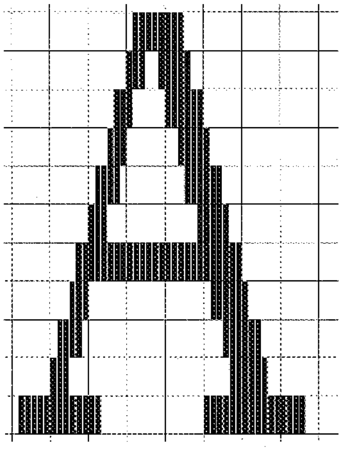
FIG. 7A illustrates an overscaled bitmap of an example character.
Figure 7B:
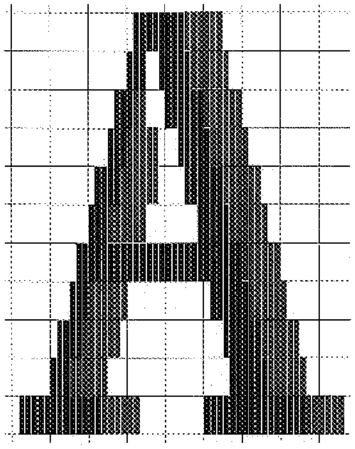
FIG. 7B illustrates the process of emboldening applied to the overscaled bitmap (of FIG. 7A)
Figure 7C:
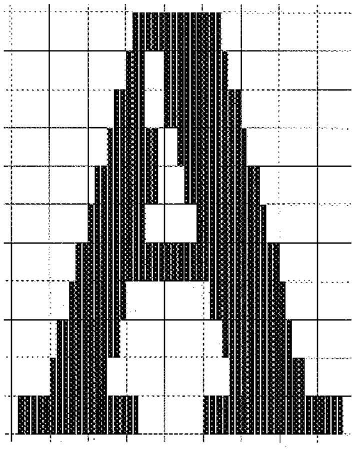
FIG. 7C illustrates an emboldened overscaled bitmap of the example character (of FIG. 7A)
Figure 7D:
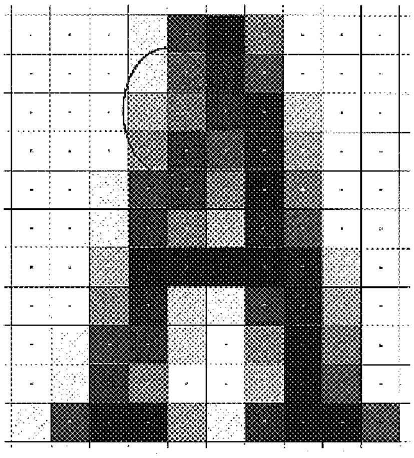
FIG. 7D illustrates the result of emboldening applied to the overscaled bitmap of FIG. 7C after being rasterized to colors.
Figure 7E:
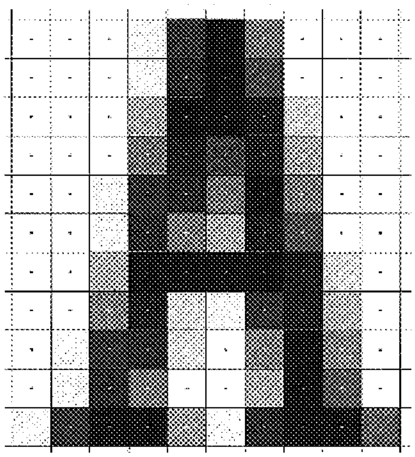
FIG. 7E illustrates the result of emboldening applied to the overscaled bitmap of FIG. 7A with emboldening by 1 full pixel and no "keeping distance" after being rasterized to colors.

The method is that for every black subpixel in the input overscaled bitmap, add a number between 0 and 6 of black subpixels to the right, so that the distance between the last added black subpixel and the next (to the right) black subpixel of the input overscaled bitmap will be at least 3 (white) subpixels. This short method has some drawbacks. For example, for an 'A' character with input overscaled bitmap shown in FIG. 7A, the algorithm will turn on subpixels shown in red in FIG. 7B, and create the resulting emboldened overscaled bitmap shown in FIG. 7C. The emboldened bitmap has a narrow region of white subpixels at the top junction between left and right inclined strokes, which does not reflect the original design, and which results in lighter colors of pixels after the bitmap is mapped to real display colors. For instance, compare the highlighted region in FIG. 7D resulting from the overscaled bitmap of FIG. 7C with the corresponding region in FIG. 7E resulting from an algorithm that adds 6 subpixels to every black subpixel of the input bitmap without keeping distance. The region of lighter pixels (as shown in FIG. 7D) can create unwanted (though relatively minor) visual effects when the emboldened bitmaps are rendered at actual sizes, such as a tiny dot of a lighter color (visually white) in the dark region above the connection at the top of the left and right inclined strokes.

Figure 8:
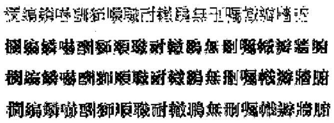
FIG. 8 illustrates actual rendering of a sequence of regular weight characters, and the same sequence of characters on the following three lines after emboldening (in currently applied CT, by 1 full pixel, and using a "keeping distance" algorithm)

While not perfect, this simulated emboldening method maintains vertical separation between close vertical elements in the original design, and therefore results in improvement in the overall rendering quality as compared to the conventional <CT: Alg Standard>) method, and the algorithm that adds a number of subpixels corresponding to 1 pixel without keeping a distance. In FIG. 8, the first line corresponds to a run of regular weight text rendered in CT mode, the second line corresponds to results of the currently applied emboldening (according to <CT: Alg Standard>), the third line corresponds to the algorithm that adds 6 black subpixels to the right from every black subpixel of the input overscaled bitmap, and the fourth line corresponds to the simple "keeping distance" algorithm described above.

Another principle (referred to as <Gen:3>) is that the number and/or pattern of the subpixels that are turned on (colored black) by an emboldening algorithm can be different for different locations in the bitmap and can be computed based on any kind of "contextual" information, where the "context" need not be limited to information based on the immediate neighborhood in the direction of emboldening or to any other kind of local neighborhood.

This allows a variety of factors to be considered in the computation of the number/pattern of subpixels being turned on, and provides the potential to make the resulting bitmap fit unique characteristics of the input bitmap. Adjusting to the variable characteristics of the input bitmaps allows, in turn, improved quality of the resulting bitmaps by maintaining elements of a character's design and keeping balanced "heaviness" (locally and globally) specific to a character.

The algorithm described above in relation to <Gen:2> is actually a simple "contextual" algorithm since it turns on different numbers of subpixels depending on the distance between black subpixels of the input bitmap. This algorithm takes into account a subpixel's neighborhood in the direction of emboldening only.

Figure 9:
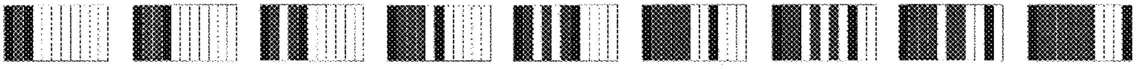
FIG. 9 illustrates several contextual mappings for use in maintaining visual

Another algorithm that also shares this characteristic (analyzing the neighborhood in the direction of emboldening only) but which operates with subpixel patterns (rather than just subpixel numbers) is described below. Suppose again that we are emboldening in the horizontal direction to the right with emboldening shift of 1 pixel and that every pixel is subdivided into 6 subpixels. For every black subpixel followed by a white subpixel to the right, the algorithm measures the distance to the next black subpixel and then assigns a pattern of black/white subpixels to the white subpixels in-between those two black subpixels. For example, depending on the distance between the black subpixels, the pattern can be defined as follows. In FIG. 9, black subpixels represent black subpixels of the input bitmap and red subpixels represent a black pattern that will be assigned to the white subpixels as a result of emboldening. The patterns show interspaced subpixels for distances ranging from one subpixel at the left to nine subpixels at the right.

This algorithm not only tries to keep visual distance between black subpixels of the input bitmap, but also tries to fill in the white space between black subpixels of the input bitmap in a more uniform manner in order to avoid having vertical lighter regions of white subpixels in junctions of inclined strokes (an effect described in relation to <Gen:2>). A characteristic of this algorithm is that it always turns on a minimal number of subpixels (at least 2 subpixels for distances greater than or equal to 2 subpixels). This characteristic helps to avoid extreme differences in widths of the vertical strokes (strokes perpendicular to the direction of emboldening) after emboldening and also provides an additional remedy for the problem related to connections between inclined strokes.

Figure 10A:
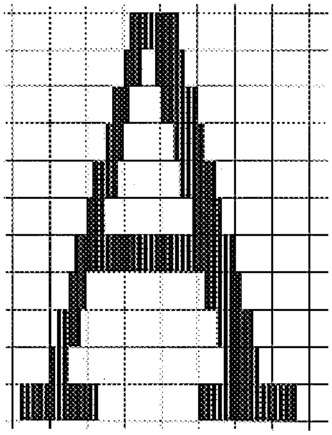
FIGS. 10A through 10E show the application of simulated emboldening in accordance with the principles of the present invention to an actual overscaled input bitmap.
Figure 10B:
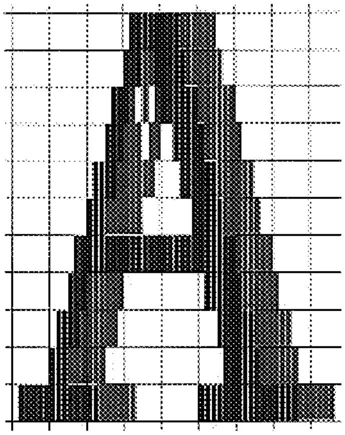
Figure 10C:
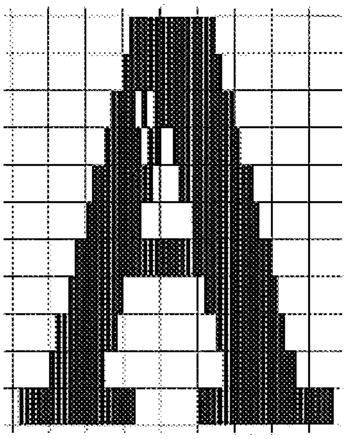
Figure 10D:
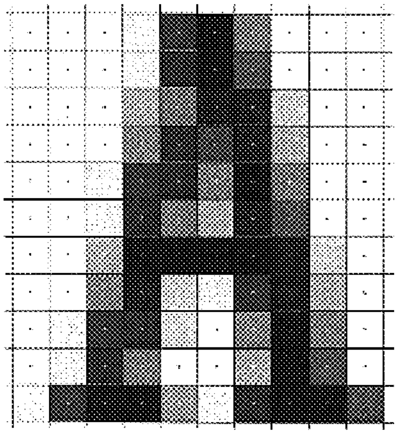
Figure 10E:
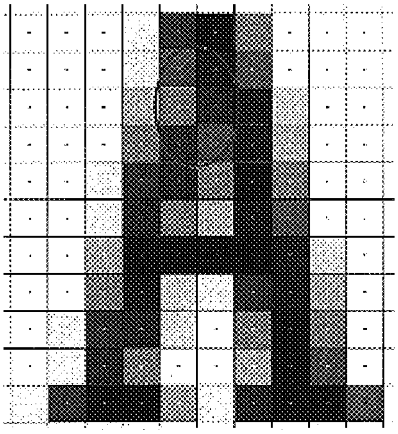

An example of application of this algorithm is shown in FIGS. 10A through 10E. FIG. 10A corresponds to the input overscaled bitmap. FIG. 10B shows the input overscaled bitmap and subpixels that are turned on as the result of emboldening. FIG. 10C shows the resulting overscaled bitmap. FIG. 10D shows mapping to the color of the overscaled bitmap of FIG. 10C. Note that the white region in the junction of two inclined strokes has disappeared and the resulting colors have become darker in the region of the junction (compare to FIG. 10E which represents the result of an algorithm described in relation to <Gen:2>).

Emboldening methods that extend "context" in a direction perpendicular to the direction of emboldening and also extend "context" beyond any predefined local neighborhood are described in relation to principles <Gen:4A> and <Gen:4B> (both described below), which herein will collectively be referred to also as <Gen:4>.

Under the principle <Gen:4A>, a "path" is defined as a series of subpixels that is at least approximately perpendicular to the direction of the emboldening. Under the principles <Gen:4B>, averaging (or smoothing) is used in the direction along the paths. For overscaled input bitmaps, samples in the input bitmaps are represented by subpixels and therefore a "path" is defined as a sequence of subpixels. More precisely, a "path" is a sequence of the subpixels that could cause values of other subpixels to be modified as a result of emboldening (as opposed to the subpixels whose values are actually to be modified as a result of the emboldening). This definition is introduced for convenience of description only and can be changed without departing from the principles of the present invention. The subpixels that cause values of other subpixels to be modified as a result of emboldening will also be referred to as "leading subpixels". Therefore, a "path" represents a sequence of the leading subpixels.

For example, for emboldening in the horizontal direction to the right, a black subpixel of an input bitmap having an immediate white neighbor at the right will play the role of a leading subpixel. More generally, a leading subpixel is a black subpixel of an input bitmap followed by a white subpixel in the direction of emboldening.

First an initial amount of emboldening is computed for every leading subpixel in terms of the number (not necessarily a whole number) of subpixels to be blackened after the leading subpixel in the direction of emboldening. This computation may be performed by any appropriate algorithm, including the contextual algorithms described in relation to principle <Gen:2>.

Since computation of the initial amount of emboldening usually relies on a relatively limited neighborhood of a leading subpixel (and often relies on the neighborhood in the direction of emboldening only), reliance on the initial emboldening alone may result in abrupt sharp variations in the initial amount of emboldening for the leading subpixels that are close one to another in the same path. Frequently, those variations result in a local appearance of the overscaled bitmap that does not reflect the original design of the character (see for example results of the algorithms described in relation to <Gen:2>). In order to smooth those variations and avoid unwanted visual effects caused by emboldening, an averaging is applied. In order to preserve the original design of a character, it is advantageous to maintain an approximately even amount of emboldening applied to every "structural element" of the input bitmap. Therefore, an averaging "path" generally should follow some "structural element". However, the interpretation of what a "structural element" is may vary widely.

One of the simplest definitions of a "path" could be: a continuous vertical (assuming emboldening in the horizontal direction) sequence of the leading subpixels. However since we work with an input bitmap in the horizontally overscaled format which is very sensitive to small variations in the original design of a character, a strictly vertical sequence of the leading subpixels will be frequently "too short" corresponding to a part of a "structural element" rather than to a whole element or completely failing to trace a "structural element". Therefore a definition of a "path" should be slightly more elaborate than just tracing leading subpixels in the strictly vertical direction.

Figure 11A:
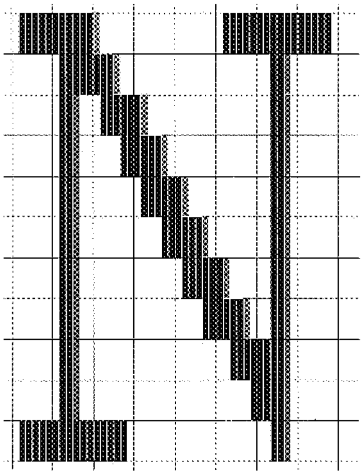
FIGS. 11A through 11C show several input overscaled bitmaps with several "paths" being defined.
Figure 11B:
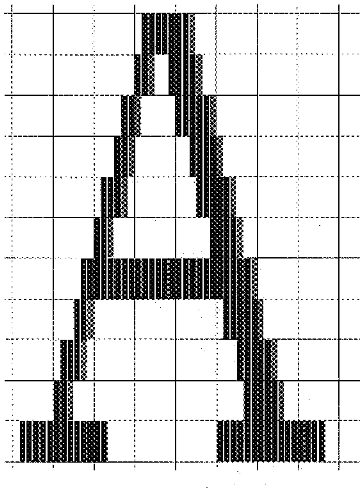
Figure 11C:
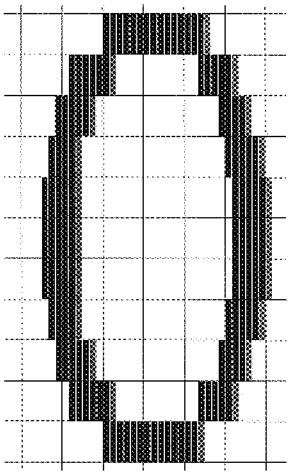

For example (assuming emboldening in the horizontal direction), a "path" can be defined as a sequence of the leading subpixels so that two consequent subpixels in the "path" belong to two consecutive rows and the "step" between subpixels in the horizontal direction does not exceed a definite number of subpixels. In general this number of subpixels can be reasonably defined from consideration of the ratio of the overscaling factors in X and Y direction. For example, if a pixel is horizontally subdivided into 6 subpixels and the maximal "step" does not exceed 5 subpixels, the definition of a "path" will identify an additional "path" corresponding to the inclined stroke for the letter 'N' (see FIG. 11A), will identify 3 "paths" corresponding to the inclined strokes for the letter 'A' (see FIG. 11B), and will identify 2 "paths" for the letter 'O' (see FIG. 11C). In FIGS. 11A, 11B and 11C, the "paths" are represented by the lighter, colored (non-black) portion to the right of structural elements (represented by black) in the original overscaled input bitmap.

The definition of a "path" can be further extended so that a "path" will be able to continue in spite of intersections with horizontal strokes. In that case, the character of FIG. 11B would only have two paths, rather than three. However, an algorithm should keep balance between the complexity of identifying a "structural element" and the corresponding advantages that complexity gives for the appearance of the rendering result, since identification of the "paths" may likely be done at run-time.

At the second step of the algorithm, "averaging along the path" is performed for every "path". This means that an averaging algorithm will be applied to the amounts of emboldening computed at the first step for the element of a "path". The resulting amount of emboldening will be assigned (i.e. the number of subpixel computed by an averaging algorithm will be turned on). An averaging itself can be performed according to any averaging scheme (such as uniform averaging or averaging with different weights; averaging along the whole "path" or only for several neighbors of a subpixel and so on . . .)

Examples below show results of emboldening with and without averaging. In all examples, the amount of emboldening computed without averaging serves as an input to the averaging algorithm. The "paths" are defined as sequences of leading subpixels so that two consequent subpixels in a "path" belong to two consecutive rows and the "step" between subpixels in the horizontal direction does not exceed 5 subpixels. A uniform averaging is applied along every "path".

Figure 12A:
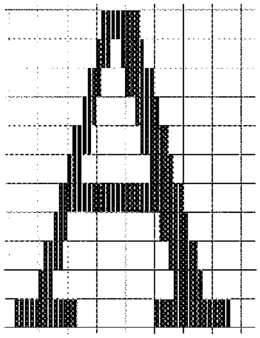
FIGS. 12A through 12D illustrate the process of emboldening using path generation and averaging as applied to a first example overscaled bitmap.
Figure 12B:
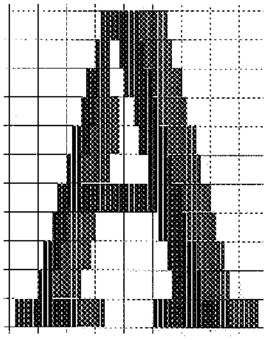
Figure 12C:
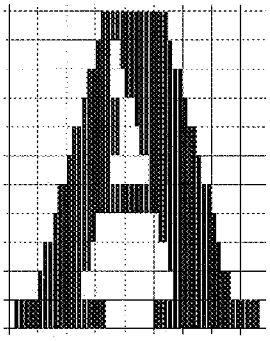
Figure 12D:
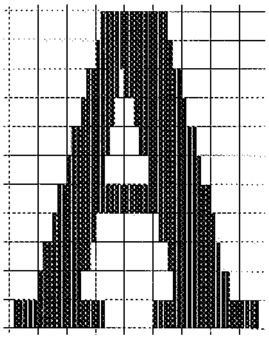
Figure 13A:
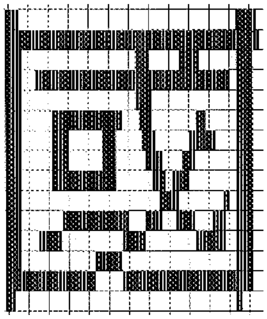
FIGS. 13A through 13D illustrate the process of emboldening using path generation and averaging as applied to a second example overscaled bitmap.
Figure 13B:
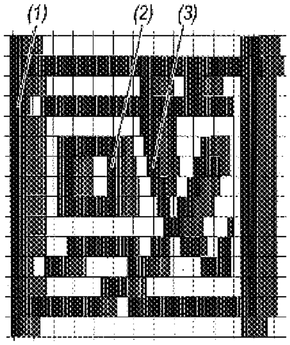
Figure 13C:
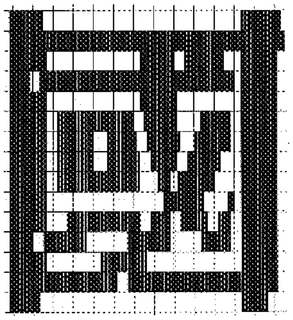
Figure 13D:
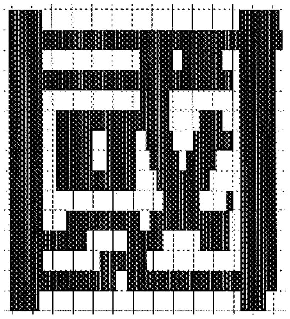

FIGS. 12A and 13A correspond to the different input overscaled bitmaps for two different characters. FIGS. 12B and 13B show the amount of emboldening computed for every leading subpixel according to the algorithm described in relation to <Gen:2>. FIGS. 12C and 13C show the respective results of emboldening as it would look like before averaging. FIGS. 12D and 13D show the results of emboldening after averaging. Note that FIGS. 12D and 13D reflect the design of the original characters much better than FIGS. 12C and 13C. For the character of FIG. 13B, note, for example, the uneven width of strokes (1) and (3) and the increasing downward width of stroke (2) which does not reflect the original design of the character. These undesired design variances disappear after averaging as can be seen from FIG. 13D.

These emboldening algorithms work directly on overscaled bitmaps, according to the general concept <Gen:0>. Therefore the new emboldening algorithm should be applied immediately after an overscaled bitmap is computed (immediately after stage (AA or CT: Outline To Overscaled Bitmap)) and before it is converted into a simple bitmap (before stage (AA or CT: Overscaled To Simple Bitmap)).

Figure 14:
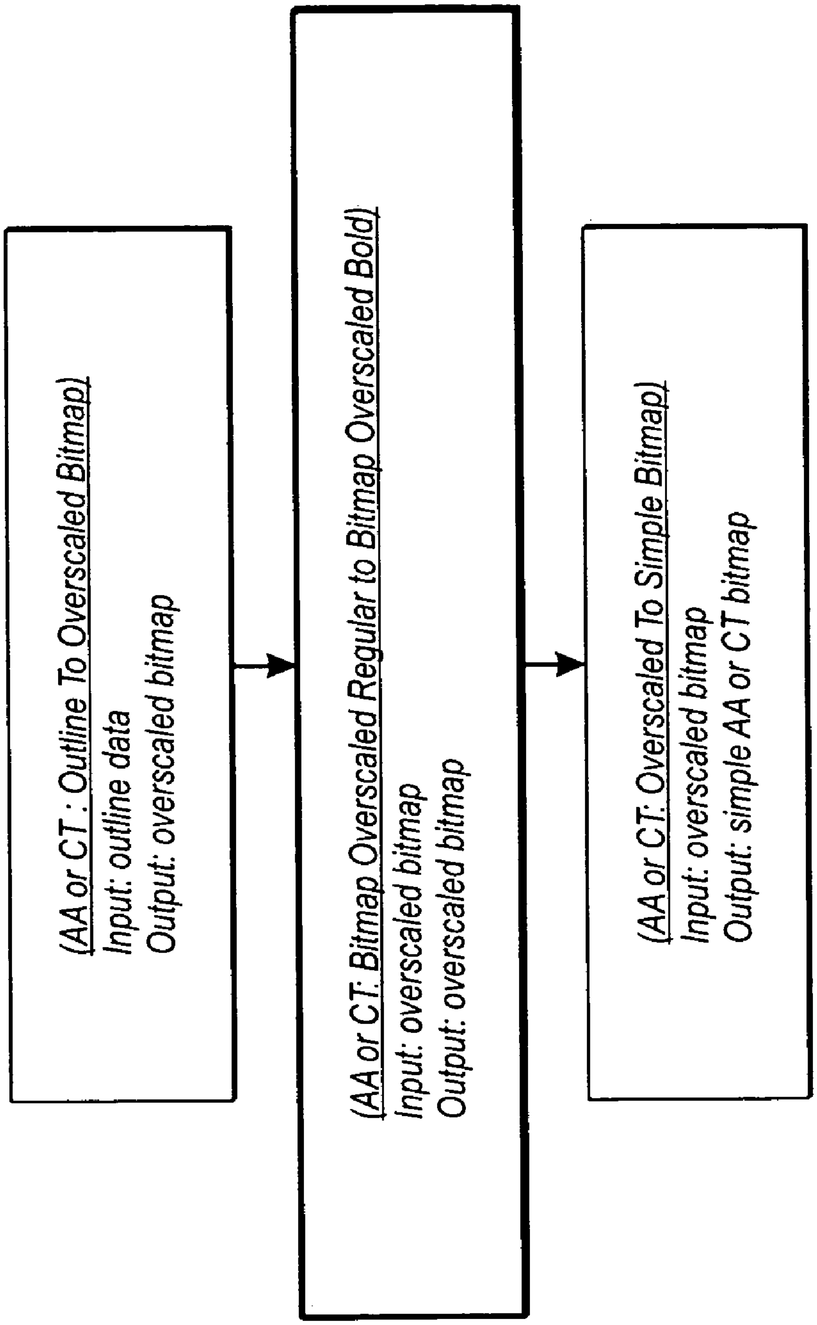
FIG. 14 illustrates the context for the simulated emboldening in which an overscaled input bitmap is emboldened to generate an overscaled output bitmap.

FIG. 14 shows where in the rasterization process the new emboldening (stage (AA or CT: Bitmap Overscaled Regular to Bitmap Overscaled Bold)) takes place. In the case of AA rendering, the embedded AA bitmaps are ignored and the rendering starts from the outline data.

Now, a particular parametric family <F2> of algorithms that follows the general concepts <Gen:0>, <Gen:1>, <Gen:2>, <Gen:3> and <Gen:4> will be described. Besides making some of the concepts more specific, the algorithmic family describes a particular order of the operations. A possible choice of parameters for this algorithmic family (i.e. a specific algorithm from the family) is now described along with a comparison between the new algorithm and the currently commonly applied algorithm.

The algorithmic family (referring to herein by "<F2>") is defined by the following set of parameters and following order of operations.

First (F2: Step:1), compute "initial amounts of emboldening" for every leading subpixel. The initial amount of emboldening is expressed in the number of subpixels that should be turned on in the direction of emboldening for every leading subpixel. The algorithms from the family <F2> use a simple contextual approach (see <Gen:2>, <Gen:3>) for computation of the initial amounts of emboldening based on a one-dimensional neighborhood of a subpixel in the direction of emboldening. The algorithm counts the number of white subpixels following a leading subpixel in the direction of emboldening and determines the initial amount of emboldening as the maximal number of subpixels which does not exceed some pre-defined number of subpixels (NumSpMax) and so that distance from the next black subpixel in the direction of emboldening will not become less than some pre-defined number of subpixels (DistMin). The maximal amount of emboldening NumSpMax depends on the overscale factor(s) and the requested emboldening shift(s).

The maximal amount of emboldening can differ for horizontal and vertical directions and for different values of the emboldening shifts. For example, for the standard CT rendering with overscale factor 6 in the horizontal direction and for requested emboldening in the horizontal direction with emboldening shift of 1 pixel, the maximal amount of emboldening will be defined as 6. The choice of the minimal distance that should be kept from the next black subpixel will be represented by the first parameter of the parametric family <F2: Par:1> (Value 0 —i.e. no minimal distance—is a valid choice for the minimal distance), <F2:Par:1> can represent a pair of values if different minimal distances are intended to be used in the horizontal and vertical directions.

Next (F2:Step:2), the averaging "paths" are found and an averaging algorithm is applied along every averaging "path" (see <Gen:4>). The particular definition of the averaging "path" and particular choice of the averaging algorithm define respectively second and third parameters of the parametric family <F2:Par:2> and <F2:Par:3>. Note that "no averaging" is a valid choice for <F2:Par:3>. Note also that if desired, different definitions for <F2:Par:2> and <F2:Par:3> can be applied in horizontal and vertical directions.

For every averaging "path", for all the leading subpixels that belong to the "path", assign the resulting amount of emboldening as maximum between the resulting average value and a pre-defined minimal amount of emboldening. The minimal amount of emboldening is represented by the forth parameter of the parametric family <F2:Par:4>. The purpose of the minimal amount of emboldening is to prevent extreme variation in the stroke width for the strokes following different averaging "paths". A value 0 is a valid value for the minimal amount of emboldening. Also, different minimal amounts of emboldening can be applied in the horizontal and the vertical directions. The resulting amount of emboldening is expressed in the number of subpixels. For every leading subpixels that belongs to a "path", this number of white subpixels immediately following the leading subpixel in the direction of emboldening will be turned on. If, for a particular leading subpixel, there are less continuous white subpixels in the direction of emboldening than the resulting value of subpixels, an algorithm may decide either to stop turning on the subpixels corresponding to this leading subpixel as soon as it encounters the first black subpixel or to continue.

An example of a specific algorithm from the parametric family <F2> for emboldening in CT rendering mode in the horizontal direction. In this example, it is assumed that every pixel is subdivided by 6 subpixels in the horizontal direction (and is not subdivided in the vertical direction).

Figure 15:
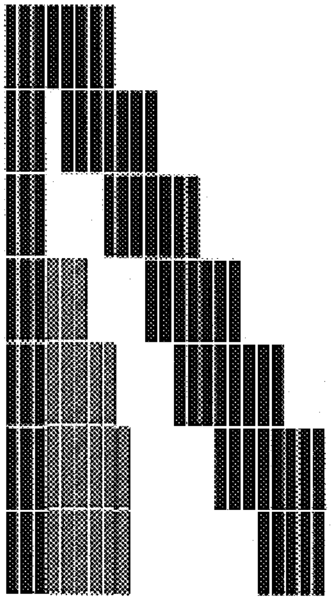
FIG. 15 illustrates an amount of emboldening along leading subpixels of a vertical stem (stroke) using one method for emboldening.

The parameters of the particular algorithm described below may be chosen after visual comparison of algorithms from the algorithmic family described above with different parameters to thereby achieve a balance between quality of the results and complexity of the algorithm applied. The specific choice of the parameters is presented below:

The parameter <F2:Par:1>(i.e., the minimal distance that should be kept from result of the emboldening and the next black subpixel for computation of the initial amounts of emboldening) is 4 subpixels. For example (assuming emboldening to the right with emboldening shift of 1 pixel), FIG. 15 shows amounts of emboldening (numbers of subpixels) computed for the leading subpixels of the vertical stem. Subpixels of the input bitmap are shown in black, while lighter colored subpixels represent subpixels that would be added at the right from the vertical stem as result of computation of the initial amount of emboldening.

The parameter <F2:Par:2> (i.e., the definition of the averaging "path") is identified to be exactly the same definition as was described in relation to <Gen:4B>. Specifically, a "path" is defined as a sequence of the leading subpixels so that two consequent subpixels in the "path" belong to two consecutive rows and the "step" between subpixels in the horizontal direction does not exceed 5 subpixels.

The parameter <F2:Par:3> (i.e., the averaging algorithm) is identified as being a uniform averaging along every averaging "path". For configuration of subpixels shown in FIG. 16, the result of the uniform averaging (rounded to the nearest integer) will be Round $\{(0+0+3+5+6+6)/6\}=3$.

Figure 16:
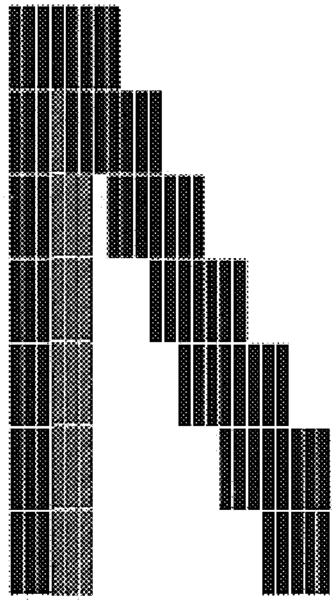
FIG. 16 illustrates an amount of emboldening along leading subpixels of a vertical stem (stroke) using another method for emboldening.

The next parameter, <F2:Par:4> (i.e., the minimal amount of emboldening) is set to 2 subpixels. For the configuration of subpixels shown in FIG. 16, the resulting amount of emboldening will be equal 3 subpixels and result of the emboldening of the vertical stem is shown in FIG. 16.

Figure 17B:
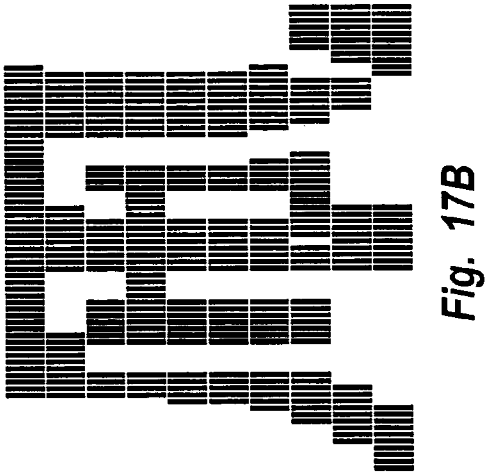
FIGS. 17A through 17C illustrate the process of emboldening using path generation and averaging as applied to a second example overscaled bitmap.
Figure 17D:
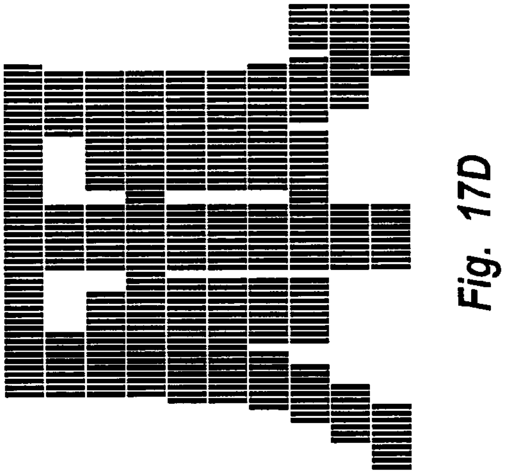
FIG. 17D illustrates emboldening the overscaled bitmap of FIG. 17A uniformly by 6 subpixels to the right.
Figure 17A:
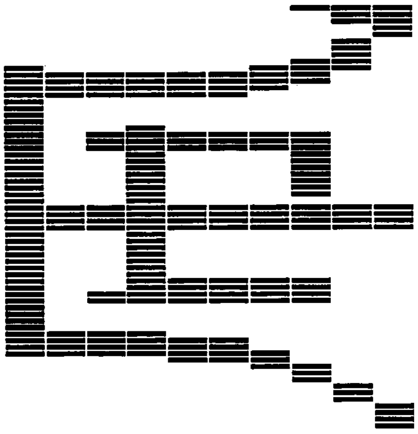
Figure 17C:
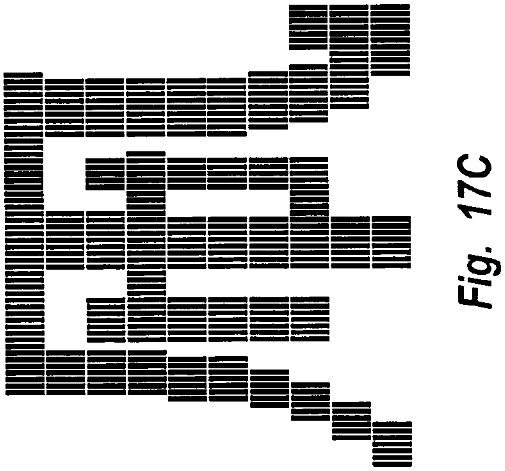

The results of the application of the particular algorithm described above to a character is shown in FIGS. 17A through 17C. FIG. 17A represents an original overscaled regular weight input bitmap. FIG. 17B represents the corresponding bitmap emboldened by initial amounts of emboldening computed at step (F2:Step:1). FIG. 17C represents a corresponding overscaled bitmap emboldened by the complete algorithm described above. FIG. 17D represents a corresponding overscaled bitmap emboldened uniformly by 6 subpixels to the right. Note the FIG. 17C represents the original design of the character (in FIG. 17A) much better than FIG. 17B and is much more legible than FIG. 17D.

Accordingly, the emboldening methods provide emboldening directly to overscaled bitmaps while more closely preserving the original design of the character. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A computer-implemented method for emboldening an input oversealed bitmap, the method comprising the following:

an act of accessing the input overscaled bitmap; and an act of using the input overscaled bitmap to generate an emboldened overscaled bitmap by at least performing the following:

an act of identifying a direction of emboldening;

an act of identifying a plurality of different subpixels within the bitmap that are part of a character to be emboldened and that each border one or more corresponding neighbor subpixels that are not part of the character;

for each of the identified plurality of different subpixels, an act of selecting a number of neighboring subpixels that are not part of the character to be altered in such a way that they become part of an emboldened character, and wherein the selected number of neighboring subpixels to be altered for each of at least two of the identified plurality of different subpixels is different; and an act of selectively altering at least some of the selected number of neighboring subpixels in the direction of emboldening so that they become part of the emboldened character, wherein the act of altering includes averaging the different selected numbers of at least two identified plurality of different subpixels in such a way as to smooth variations between different selected numbers of neighboring subpixels to be emboldened; and an act of at least displaying or transmitting the emboldening overscaled bitmap.

2. A computer-implemented method in accordance with claim 1, wherein the number of subpixels that are selected to be altered is selected such that the furthest of the neighboring subpixels in the direction of emboldening is separated in the direction of emboldening from a next subpixel of the character by a predefined fraction of the number of subpixels corresponding to a pixel in the direction of emboldening, and such that a separation is maintained between different strokes of a character being emboldened and to avoid complete blocking of white space between the strokes.

3. The computer-implemented method of claim 1, wherein the act of selecting a number of subpixels to be altered takes into consideration subpixel values in directions other than strictly the direction of emboldening.

4. The computer-implemented method of claim 1, wherein the act of selecting a number of subpixels to be altered comprises an act of guaranteeing that the number of selected subpixels has a minimum value greater than one subpixel.

5. The computer-implemented method in accordance with claim 4, wherein the act of using the input overscaled bitmap to generate an emboldened overscaled bitmap further comprises the following:

an act of identifying a path of a sequence of subpixels from the identified plurality of different subpixels and that generally exists in a direction perpendicular to a direction of the emboldening that causes values of other subpixels neighboring the path in the sequence of subpixels within the direction and of emboldening to be emboldened;

an act of assigning, for each of the identified plurality of different subpixels within the path, an initial emboldening level that defines a number of the neighboring subpixels that neighbor the identified plurality of different subpixels within the path in the direction of emboldening to be emboldened; and an act of applying averaging of the initial assigned emboldening levels to generate final emboldening levels to the neighboring subpixels, the final emboldening levels defining a final number of neighboring subpixels to embolden in the direction of emboldening.

6. The computer-implemented method in accordance with claim 3, wherein the act of using the input overscaled bitmap to generate an emboldened overscaled bitmap further comprises the following:

an act of identifying a path of a sequence of subpixels generally in a direction perpendicular to a direction of the emboldening that causes values of other subpixels neighboring the path in the direction of emboldening to be emboldened;

an act of assigning an initial emboldening level to each of the neighboring subpixels that neighbor the path in the direction of emboldening; and an act of applying averaging of the initial assigned emboldening levels to generate final emboldening levels to the neighboring subpixels.

7. The computer-implemented method in accordance with claim 2, wherein the act of using the input overscaled bitmap to generate an emboldened overscaled bitmap further comprises the following:

an act of identifying a path of a sequence of subpixels generally in a direction perpendicular to a direction of the emboldening that causes values of other subpixels neighboring the path in the direction of emboldening to be emboldened;

an act of assigning an initial emboldening level to each of the neighboring subpixels that neighbor the path in the direction of emboldening; and an act of applying averaging of the initial assigned emboldening levels to generate final emboldening levels to the neighboring subpixels.

8. The computer-implemented method in accordance with claim 1, wherein the act of using the input overscaled bitmap to generate an emboldened overscaled bitmap further comprises the following:

an act of identifying a path of a sequence of subpixels generally in a direction perpendicular to a direction of the emboldening that causes values of other subpixels neighboring the path in the direction of emboldening to be emboldened;

an act of assigning an initial emboldening level to each of the neighboring subpixels that neighbor the path in the direction of emboldening; and an act of applying averaging of the initial assigned emboldening levels to generate final emboldening levels to the neighboring subpixels.

9. The computer-implemented method in accordance with claim 1, further comprising the following:

an act of displaying the emboldened overscaled bitmap on a display.

10. A computer program product comprising one or more physical computer-readable media having thereon computer-executable instructions that, when executed by one or more processors of a computing system, causes the computing system to perform the method recited in claim 1.

11. A computer program product in accordance with claim 10, wherein the number of subpixels to be altered is selected such that the furthest of the neighboring subpixels in the direction of emboldening is separated in the direction of emboldening from a next subpixel of the character by at least some specified fraction of the number of subpixels corresponding to a pixel in the direction of emboldening.

12. The computer program product in accordance with claim 10, wherein the act of selecting a number of subpixels to be altered takes into consideration subpixel values in directions other than strictly the direction of emboldening.

13. The computer program product in accordance with claim 10, wherein the act of selecting a number of subpixels to be altered comprises an act of guaranteeing that the number of selected subpixels has a minimum value greater than one subpixel.

14. The computer program product in accordance with claim 13, wherein the act of using the input overscaled bitmap to generate an emboldened overscaled bitmap further comprises the following:

an act of identifying a path of a sequence of subpixels generally in a direction perpendicular to a direction of the emboldening that causes values of other subpixels neighboring the path in the direction of emboldening to be emboldened;

an act of assigning an initial emboldening level to each of the neighboring subpixels that neighbor the path in the direction of emboldening; and an act of applying averaging of the initial assigned emboldening levels to generate final emboldening levels to the neighboring subpixels.

15. The computer program product in accordance with claim 12, wherein the act of using the input overscaled bitmap to generate an emboldened overscaled bitmap further comprises the following:

an act of identifying a path of a sequence of subpixels generally in a direction perpendicular to a direction of the emboldening that causes values of other subpixels neighboring the path in the direction of emboldening to be emboldened;

an act of assigning an initial emboldening level to each of the neighboring subpixels that neighbor the path in the direction of emboldening; and an act of applying averaging of the initial assigned emboldening levels to generate final emboldening levels to the neighboring subpixels.

16. The computer program product in accordance with claim 11, wherein the act of using the input overscaled bitmap to generate an emboldened overscaled bitmap further comprises the following:

an act of identifying a path of a sequence of subpixels generally in a direction perpendicular to a direction of the emboldening that causes values of other subpixels neighboring the path in the direction of emboldening to be emboldened;

an act of assigning an initial emboldening level to each of the neighboring subpixels that neighbor the path in the direction of emboldening; and an act of applying averaging of the initial assigned emboldening levels to generate final emboldening levels to the neighboring subpixels.

17. The computer program product in accordance with claim 10, wherein the act of using the input overscaled bitmap to generate an emboldened overscaled bitmap further comprises the following:

an act of identifying a path of a sequence of subpixels generally in a direction perpendicular to a direction of the emboldening that causes values of other subpixels neighboring the path in the direction of emboldening to be emboldened;

an act of assigning an initial emboldening level to each of the neighboring subpixels that neighbor the path in the direction of emboldening; and an act of applying averaging of the initial assigned emboldening levels to generate final emboldening levels to the neighboring subpixels.

18. The computer program product in accordance with claim 10, further comprising the following:

an act of displaying the emboldened overscaled bitmap on a display.

19. A method as recited in claim 1, wherein the act of altering at least some of the selected number of neighboring subpixels in the direction of emboldening includes altering all of the selected number of neighboring subpixels.

20. A computer-implemented method for emboldening an input overscaled bitmap of a character, the method comprising the following:

an act of accessing the input overscaled bitmap of the character, the character having at least two features separated by subpixels that are not part of the character but that are part of whitespace separating the at least two features; and an act of using the input overscaled bitmap to generate an emboldened overscaled bitmap of the character by at least performing the following:

an act of identifying a direction of emboldening;

an act of identifying a plurality of different subpixels within the bitmap that are part of a character to be emboldened and that each border one or more corresponding neighbor subpixels that are part of the whitespace;

for at least some of the identified plurality of different subpixels, an act of selecting and emboldening a number of neighboring subpixels that are part of the whitespace and that are to be altered in such a way that they become part of an emboldened character, and wherein the selected number of neighboring subpixels is selected for each row of the character that is being altered and that also includes whitespace in such a way as to preserve at least some separation between the at least two features; and an act of at least displaying or transmitting the emboldened overscaled bitmap of the character and to thereby preserve at least some of the whitespace between the at least two features.

* * * * *